(12) United States Patent
Lee

(10) Patent No.: US 11,557,808 B2
(45) Date of Patent: Jan. 17, 2023

(54) BATTERY MODULE, BATTERY RACK INCLUDING BATTERY MODULE, AND ENERGY STORAGE SYSTEM INCLUDING BATTERY RACK

(71) Applicant: LG CHEM, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 361 days.

(21) Appl. No.: 16/651,537

(22) PCT Filed: Aug. 5, 2019

(86) PCT No.: PCT/KR2019/009747
§ 371 (c)(1),
(2) Date: Mar. 27, 2020

(87) PCT Pub. No.: WO2020/075962
PCT Pub. Date: Apr. 16, 2020

(65) Prior Publication Data
US 2021/0226290 A1    Jul. 22, 2021

(30) Foreign Application Priority Data
Oct. 12, 2018    (KR) .................... 10-2018-0122133

(51) Int. Cl.
*H01M 50/20*    (2021.01)
*H01M 50/209*    (2021.01)
(Continued)

(52) U.S. Cl.
CPC ....... *H01M 50/209* (2021.01); *H01M 10/613* (2015.04); *H01M 10/6566* (2015.04); *H01M 50/244* (2021.01)

(58) Field of Classification Search
CPC ............ H01M 50/209; H01M 50/244; H01M 10/613; H01M 10/6566
See application file for complete search history.

(56) References Cited

U.S. PATENT DOCUMENTS

2008/0220321 A1    9/2008    Yonemochi et al.
2009/0197153 A1*   8/2009    Fujikawa ............... H01M 50/30
                                                              429/82
(Continued)

FOREIGN PATENT DOCUMENTS

EP    2 244 318    * 10/2010    .............. H01M 2/10
EP    2 244 318 A2    10/2010
(Continued)

OTHER PUBLICATIONS

Extended European Search Report for European Application No. 19870286.4, dated May 21, 2021.

*Primary Examiner* — Olatunji A Godo
(74) *Attorney, Agent, or Firm* — Birch, Stewart, Kolasch & Birch, LLP

(57) ABSTRACT

A battery module includes a plurality of battery cells, a module case configured to accommodate the plurality of battery cells and having inner cooling channels formed at both sides of the plurality of battery cells. At least one opening is provided at both side surfaces of the module case to face the inner cooling channels of the module case and a pair of film members is mounted to both side surfaces of the module case to cover the at least one opening, the pair of film members being melted over a predetermined temperature to open the at least one opening.

7 Claims, 8 Drawing Sheets

(51) Int. Cl.
  *H01M 10/613* (2014.01)
  *H01M 10/6566* (2014.01)
  *H01M 50/244* (2021.01)

(56) References Cited

U.S. PATENT DOCUMENTS

2010/0181129 A1* 7/2010 Hamidi .................. B60L 53/80
                                                          180/68.5
2016/0254578 A1  9/2016 LIU et al.

FOREIGN PATENT DOCUMENTS

| | | |
|---|---|---|
| JP | 2007-273181 A | 10/2007 |
| JP | 2008-226518 A | 9/2008 |
| JP | 2008-251263 A | 10/2008 |
| JP | 2009-16076 A | 1/2009 |
| JP | 2011-258426 A | 12/2011 |
| JP | 2012-155867 A | 8/2012 |
| JP | 2014-107178 A | 6/2014 |
| JP | 2015-220176 A | 12/2015 |
| JP | 2015-220177 A | 12/2015 |
| JP | 2018-512700 A | 5/2018 |
| KR | 10-2013-0054761 A | 5/2013 |
| KR | 10-2016-0024688 A | 3/2016 |

\* cited by examiner

BATTERY MODULE, BATTERY RACK INCLUDING BATTERY MODULE, AND ENERGY STORAGE SYSTEM INCLUDING BATTERY RACK

TECHNICAL FIELD

The present disclosure relates to a battery module, a battery rack including the battery module, and an energy storage system including the battery rack.

The present application claims priority to Korean Patent Application No. 10-2018-0122133 filed on Oct. 12, 2018 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery rack by using at least one battery module and adding other components. When configuring the battery rack, an energy storage system may be configured using a plurality of battery racks.

In the conventional battery module, a cooling unit of a water cooling type or an air cooling type may be provided for cooling the battery module. Here, the cooling unit of the battery module having an air-cooling structure generally includes a cooling air supplying portion and a cooling air discharging portion. Meanwhile, when a high temperature situation occurs due to abnormal heating of at least one of the battery cells, high temperature gas and flame may be generated inside the battery module.

However, in the conventional battery module having an air-cooling structure, when such a high temperature situation occurs, high temperature gas and flame inside the battery module may be discharged out of the battery module only through the cooling air supplying portion and the cooling air discharging portion of the cooling unit. For this reason, high temperature gas and flame may not be smoothly discharged out of the battery module.

In this case, a thermal runaway of any one battery cell is propagated to adjacent battery cells, leading to explosion of the entire battery module, thereby causing a great damage.

Thus, it is required to find a way to discharge high temperature gas and flame to the outside more quickly when a high temperature situation occurs due to abnormal heating in the battery module having an air-cooling structure.

DISCLOSURE

Technical Problem

The present disclosure is directed to providing a battery module, which may quickly discharge high temperature gas and flame to the outside when a high temperature situation occurs due to abnormal heating in the battery module having an air-cooling structure, a battery rack including the battery module, and an energy storage system including the battery rack.

Technical Solution

In one aspect of the present disclosure, there is provided a battery module, comprising: a plurality of battery cells; a module case having a front surface, a rear surface, a first side surface and a second side surface, the module case configured to accommodate the plurality of battery cells and having inner cooling channels formed at both sides of the plurality of battery cells; at least one opening provided at each side surface of the module case to face the inner cooling channels of the module case; and a pair of film members, one of the pair of film members mounted to each of the side surfaces of the module case to cover the at least one opening, the pair of film members being melted over a predetermined temperature to open the at least one opening.

The at least one opening may be provided in plural, and the plurality of openings may be spaced apart from each other by a predetermined distance along a longitudinal direction of the module case.

The pair of film members may cover all of the plurality of openings.

The at least one opening may be provided in a pair, and each of the pair of openings may be respectively provided to respective side surfaces of the module case.

The pair of openings may be provided in a mesh shape.

The pair of film members may cover the pair of openings, respectively.

The battery module may further comprise a cooling unit provided to the module case to supply a cooling air toward the inner cooling channel and discharge the cooling air out of the module case.

The cooling unit may include: a cooling air supplying portion provided at the front surface of the module case to provide the cooling air toward the inner cooling channel; and a cooling air discharging portion provided at the rear surface of the module case to discharge the cooling air in the inner cooling channel to the outside of the module case.

In addition, the present disclosure further provides a battery rack, comprising: at least one battery module according to the above embodiments; and a rack case configured to package the at least one battery module.

Moreover, the present disclosure further provides an energy storage system, comprising at least one battery rack according to the above embodiments.

Advantageous Effects

According to various embodiments as above, it is possible to provide a battery module, which may quickly discharge high temperature gas and flame to the outside when a high temperature situation occurs due to abnormal heating in the battery module having an air-cooling structure, a battery rack including the battery module, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
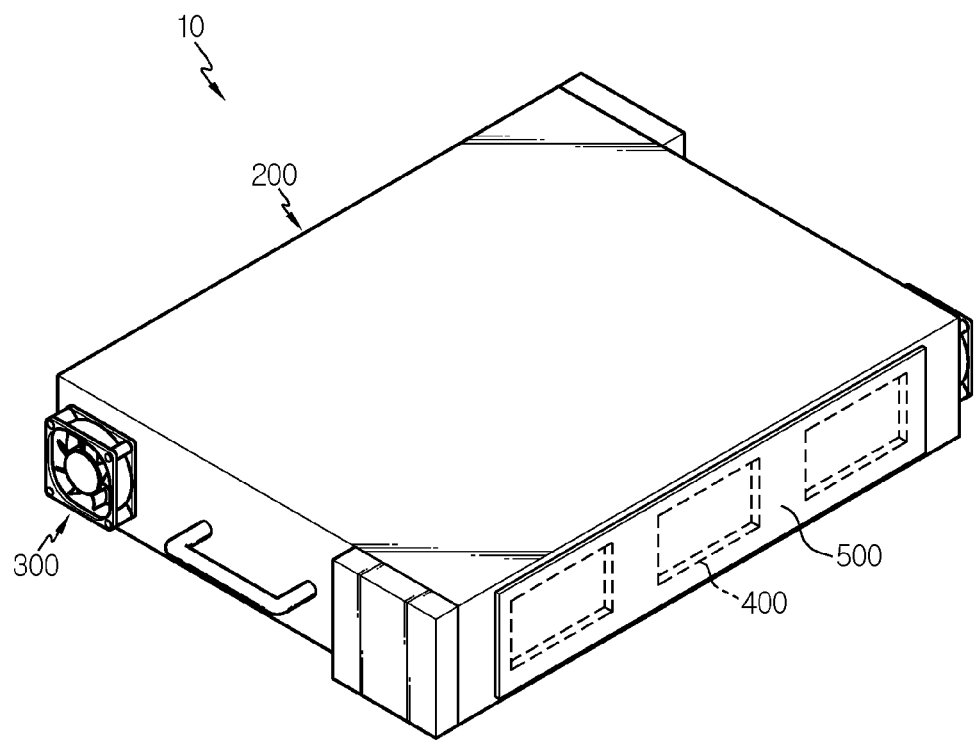
FIG. 1 is a diagram for illustrating a battery module according to an embodiment of the present disclosure.
Figure 2:
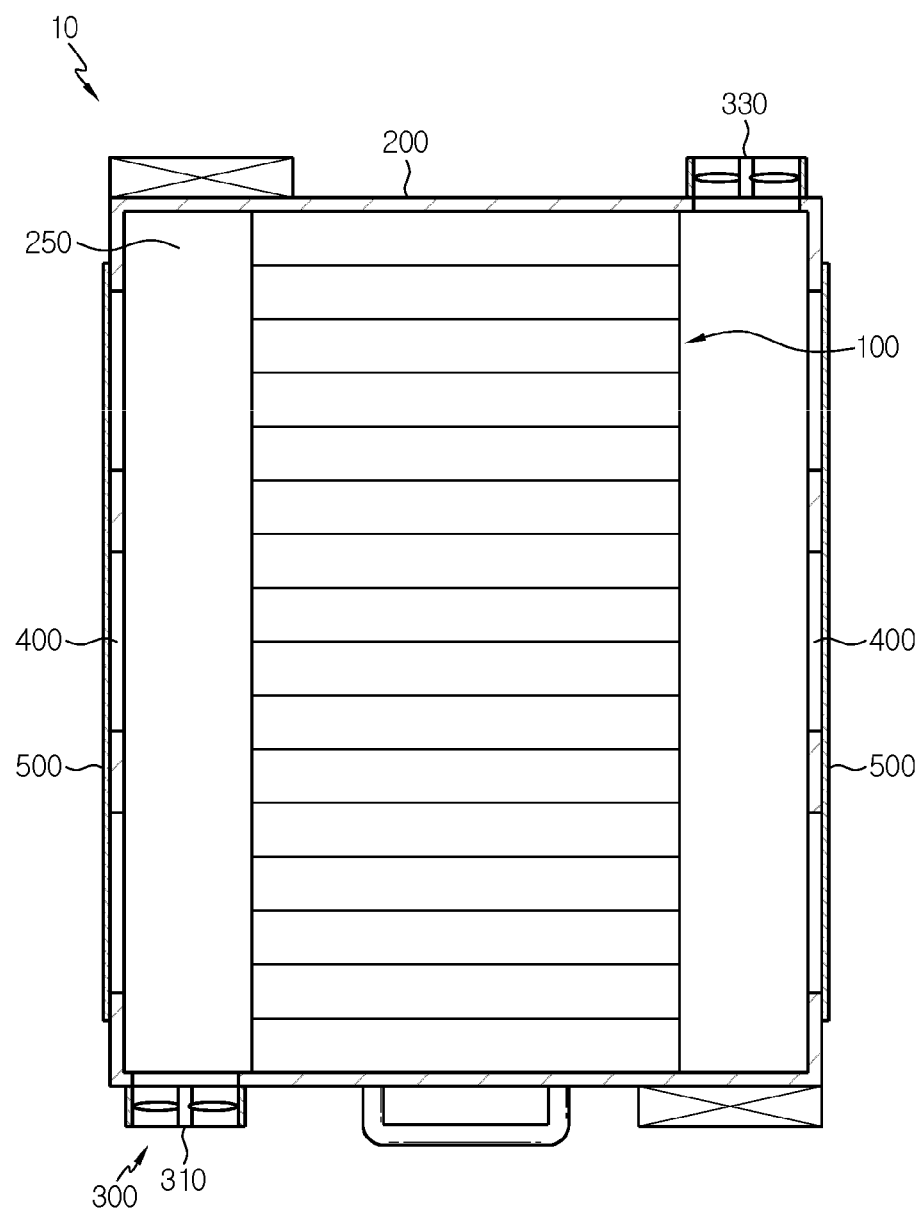
FIG. 2 is a cross-sectioned view showing the battery module of FIG. 1.
Figure 3:
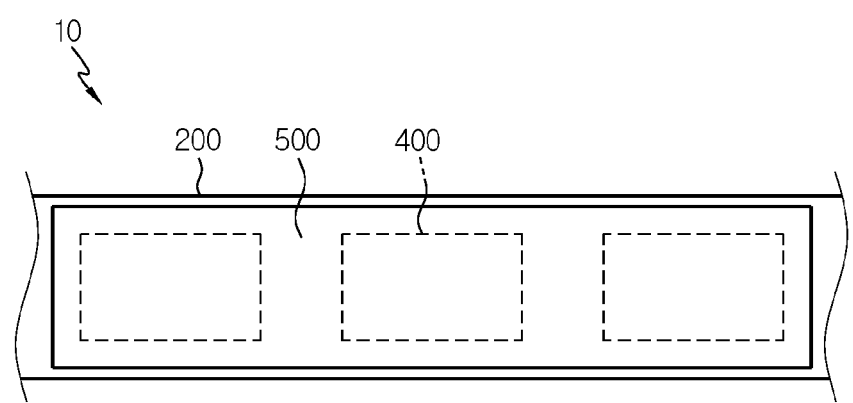
FIG. 3 is a side view showing the battery module of FIG. 1.

FIG. 1 is a diagram for illustrating a battery module according to an embodiment of the present disclosure, FIG. 2 is a cross-sectioned view showing the battery module of FIG. 1, and FIG. 3 is a side view showing the battery module of FIG. 1.

Referring to FIGS. 1 to 3, a battery module 10 may include a battery cell 100, a module case 200, a cooling unit 300, an opening 400 and a film member 500.

The battery cell 100 is a secondary battery, which may be a pouch-type secondary battery, a rectangular secondary battery or a cylindrical secondary battery. Hereinafter, in this embodiment, the battery cell 100 is described as being a pouch-type secondary battery.

The battery cell 100 may be provided in plural. The plurality of battery cells 100 may be stacked to be electrically connected to each other.

The module case 200 may accommodate the plurality of battery cells 100. To this end, the module case 200 may have an accommodation space for accommodating the plurality of battery cells 100.

The module case 200 may include an inner cooling channel 250.

The inner cooling channel 250 may be provided at both sides of the plurality of battery cells 100 inside the module case 200. The inner cooling channel 250 may be disposed in communication with the cooling unit 300, explained later.

The cooling unit 300 is for cooling the battery cells 100 and may be provided in an air-cooling type. The cooling unit 300 is provided to the module case 200, and may supply a cooling air toward the inner cooling channel 250 and discharge the cooling air out of the module case 200.

The cooling unit 300 may include a cooling air supplying portion 310 and a cooling air discharging portion 330.

The cooling air supplying portion 310 may be provided at one side of the module case 200, specifically at a front side of the module case 200, and may provide the cooling air toward the inner cooling channel 250.

The cooling air supplying portion 310 may have a cooling supply fan for smoothly supplying the cooling air toward the inner cooling channel 250 of the module case 200.

The cooling air discharging portion 330 is provided at the other side of the module case 200, specifically at a rear side of the module case 200, and may discharge the cooling air in the inner cooling channel 250 to the outside of the module case 200.

The cooling air discharging portion 330 may have a cooling discharge fan for smoothly discharging the cooling air of the inner cooling channel 250 in the module case 200.

The cooling air discharging portion 330 may be disposed diagonally to the cooling air supplying portion 310 in the front and rear direction of the module case 200. Accordingly, the cooling air may flow more smoothly in the entire inside of the module case 200.

The opening 400 may be provided at both side surfaces of the module case 200 to face the inner cooling channel 250 of the module case 200.

The opening 400 may be provided in plural.

The plurality of openings 400 may be provided at both side surfaces of the module case 200, respectively, and may be disposed to be spaced apart from each other by a longitudinal direction along a longitudinal direction of the module case 200.

The film member 500 is provided in a pair, and the pair of film members 500 may be respectively provided at both side surfaces of the module case 200 to cover the at least one opening 400, or the plurality of openings 400 respectively provided at both sides of the module case 200 in this embodiment.

The pair of film members 500 may have a size to cover all of the plurality of openings 400 respectively provided at both sides of the module case 200. The pair of film members 500 seals the at least one opening 400, or the plurality of openings 400 in this embodiment, below a predetermined temperature and may be melted over the predetermined temperature to open at least one opening 400 among the plurality of openings 400 at least partially.

To this end, the pair of film members 500 may be made of a film or foam material that is vulnerable to a high temperature over the predetermined temperature. The pair of film members 500 may be melted at a high temperature over the predetermined temperature.

Hereinafter, the form of the battery module 10 in a cooled state and a high temperature situation according to this embodiment will be described in more detail.

Figure 4:
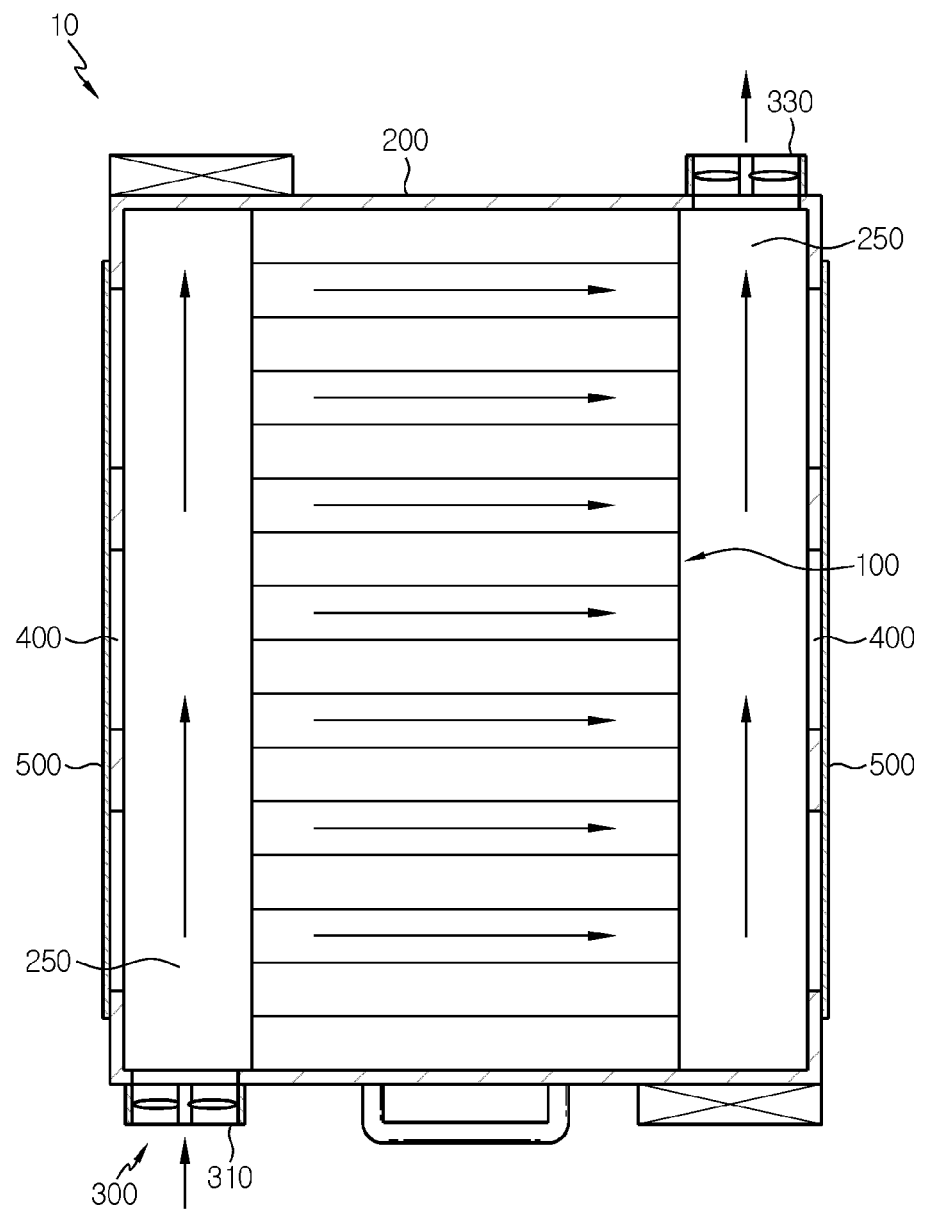
FIG. 4 is a diagram for illustrating a form of the battery module of FIG. 1 when being cooled.

FIG. 4 is a diagram for illustrating a form of the battery module of FIG. 1 when being cooled.

Referring to FIG. 4, when the battery module 10 is cooled, the cooling air supplying portion 310 of the cooling unit 300 may introduce an cooling air for cooling the battery cells 100 from the outside of the module case 200 into the module case 200.

Then, the cooling air introduced into the module case 200 may cool the battery cells 100 while flowing through the inner cooling channel 250 of the module case 200.

After that, the cooling air that cools the battery cells 100 may be discharged out of the module case 200 through the cooling air discharging portion 330 of the cooling unit 300.

Figure 5:
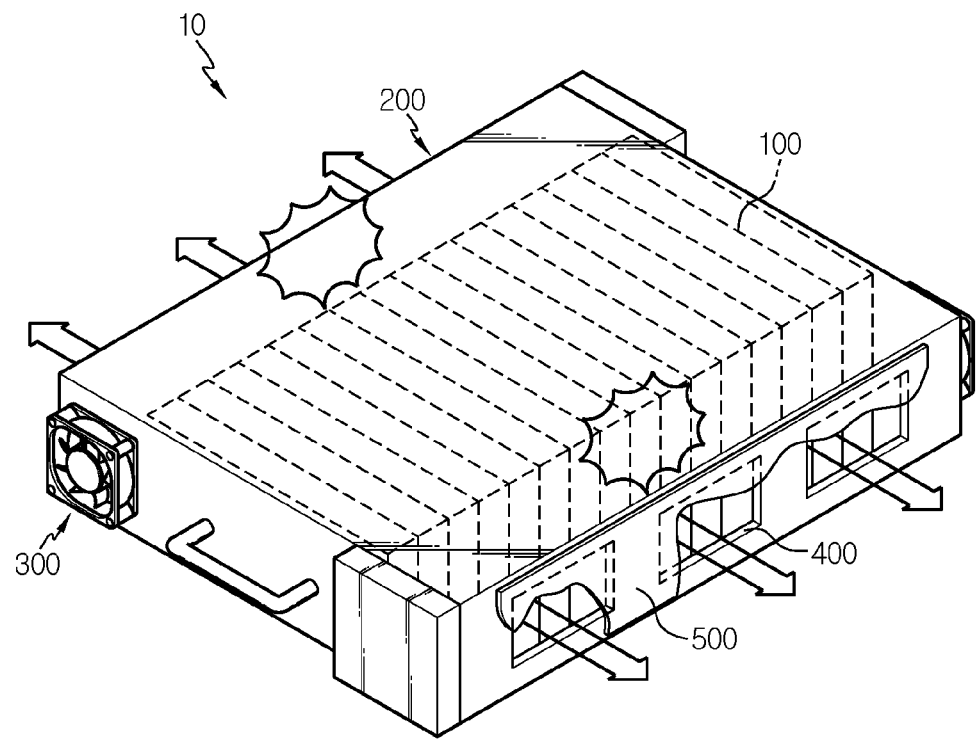
FIGS. 5 and 6 are diagrams for illustrating a form of the battery module of FIG. 1 at a high temperature situation over a predetermined temperature.
Figure 6:
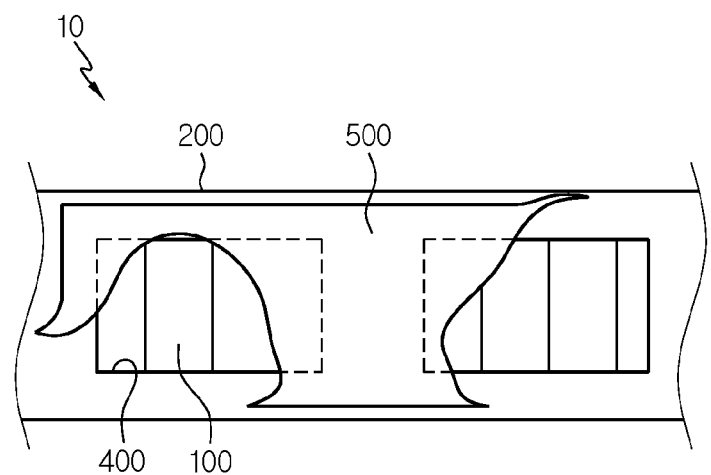

FIGS. 5 and 6 are diagrams for illustrating a form of the battery module of FIG. 1 at a high temperature situation over a predetermined temperature.

Referring to FIGS. 5 and 6, in the battery module 10, abnormal heating may occur in at least one battery cell 100 among the battery cells 100. If abnormal heating continues, a high temperature situation may occur inside the module case 200, and a high temperature gas and flame may be generated inside the module case 200.

When such high temperature gas and flame is generated, the high temperature gas and flame may not be smoothly discharged out of the module case 200 just with the cooling air supplying portion 310 and the cooling air discharging portion 330.

In this case, thermal runaway of any one battery cell propagates to adjacent battery cells, leading to explosion of the entire battery module, thereby causing a great damage.

However, in this embodiment, when high temperature gas and flame is generated in the module case 200 due to a high temperature situation, the pair of film members 500 are melted so that the plurality of openings 400 are exposed out of the module case 200.

Accordingly, in this embodiment, since the high temperature gas and flame may be quickly discharged through the plurality of openings 400, it is possible to prevent any problem that may lead to explosion of the entire battery module 10, in advance.

As a result, in the battery module 10 according to this embodiment, the plurality of openings 400 and the pair of film members 500 may guide to form a cooling path for cooling the battery cells 100 under normal operating conditions, and may also quickly discharge the high temperature gas and flame inside the module case 200 to the outside under abnormal operating conditions such as thermal runaway.

Thus, the battery module 10 according to this embodiment may ensure both reliability and stability of the battery module 10 in both normal and abnormal operating environments.

Figure 7:
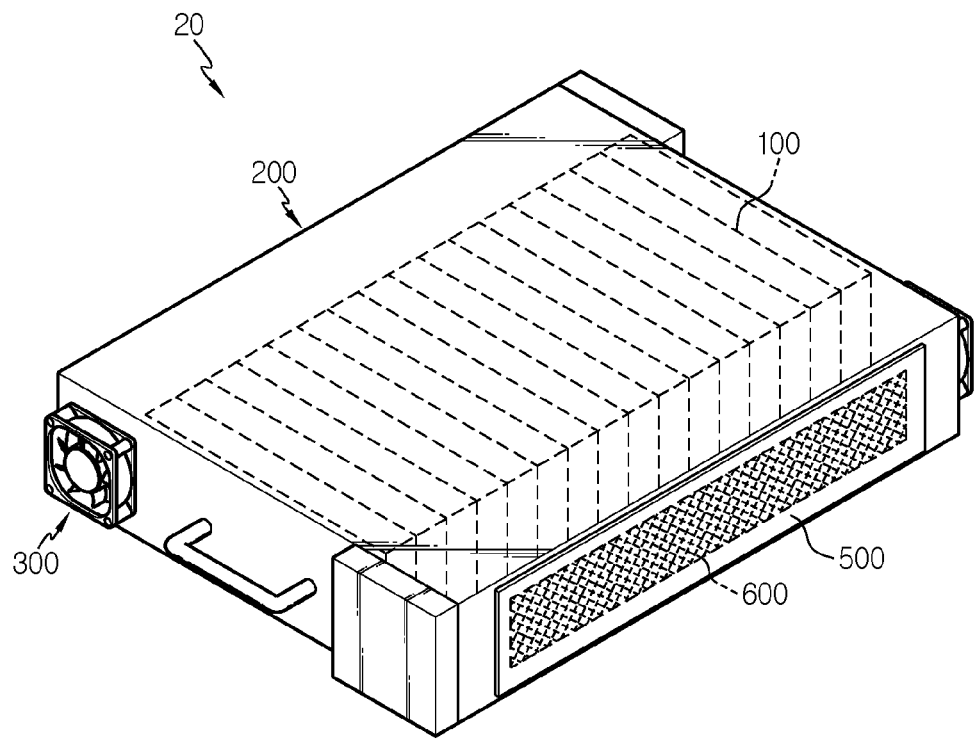
FIG. 7 is a diagram for illustrating a battery module according to another embodiment of the present disclosure.
Figure 8:
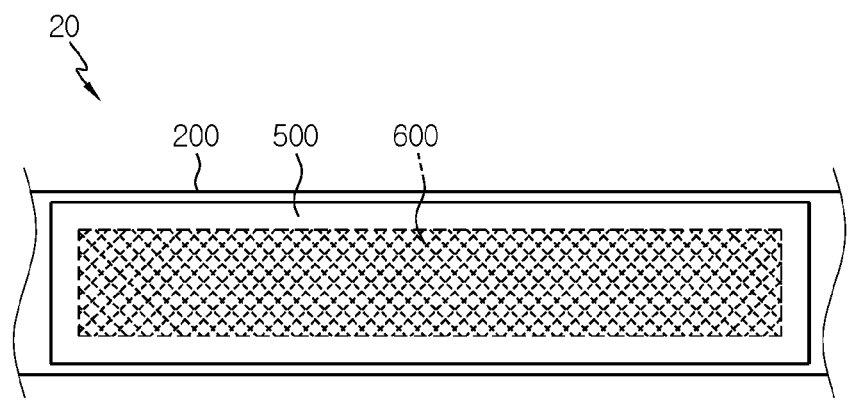
FIG. 8 is a side view showing the battery module of FIG. 7.
Figure 9:
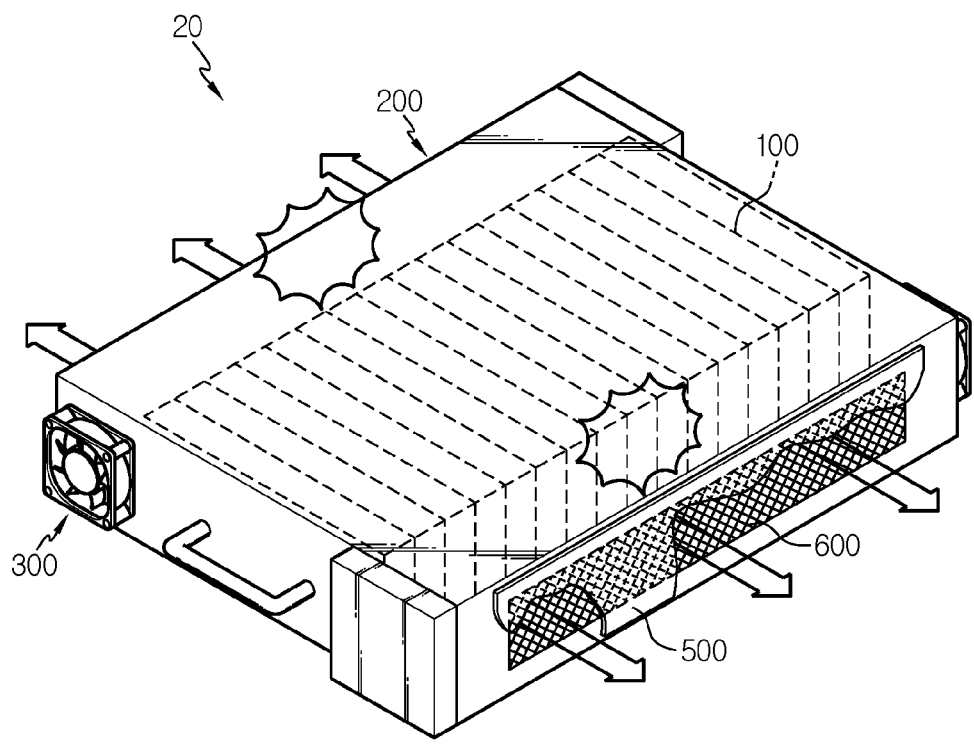
FIG. 9 is a diagram for illustrating a form of the battery module of FIG. 7 at a high temperature situation over a predetermined temperature.

FIG. 7 is a diagram for illustrating a battery module according to another embodiment of the present disclosure, FIG. 8 is a side view showing the battery module of FIG. 7, and FIG. 9 is a diagram for illustrating a form of the battery module of FIG. 7 at a high temperature situation over a predetermined temperature.

Since the battery module 20 according to this embodiment is similar to the battery module 10 of the former embodiment, hereinafter, the repeated description on a feature identical or similar to that of the former embodiment will be omitted, and the description will be mainly given based on differences from the former embodiment.

Referring to FIGS. 7 to 9, the battery module 20 may include a battery cell 100, a module case 200, a cooling unit 300, a pair of film members 500, and an opening 600.

The battery cell 100, the module case 200, the cooling unit 300 and the pair of film members 500 are substantially identical or similar to those of the former embodiment, and thus their repeated descriptions will be omitted.

The opening 600 may be provided in a pair, and the pair of openings 600 may be provided to both side surfaces of the module case 200, respectively. The pair of openings 600 may be provided in a mesh shape. Meanwhile, the pair of film members 500 may have a size to cover the pair of openings 600, respectively.

As in this embodiment, the opening 600 may be provided in a mesh shape, instead of being provided in plural. When an abnormal situation such as thermal runaway occurs, the opening 600 in a mesh shape may also be exposed out through the melted film member 500 to quickly discharge high temperature gas and flame inside the module case 200 to the outside.

Figure 10:
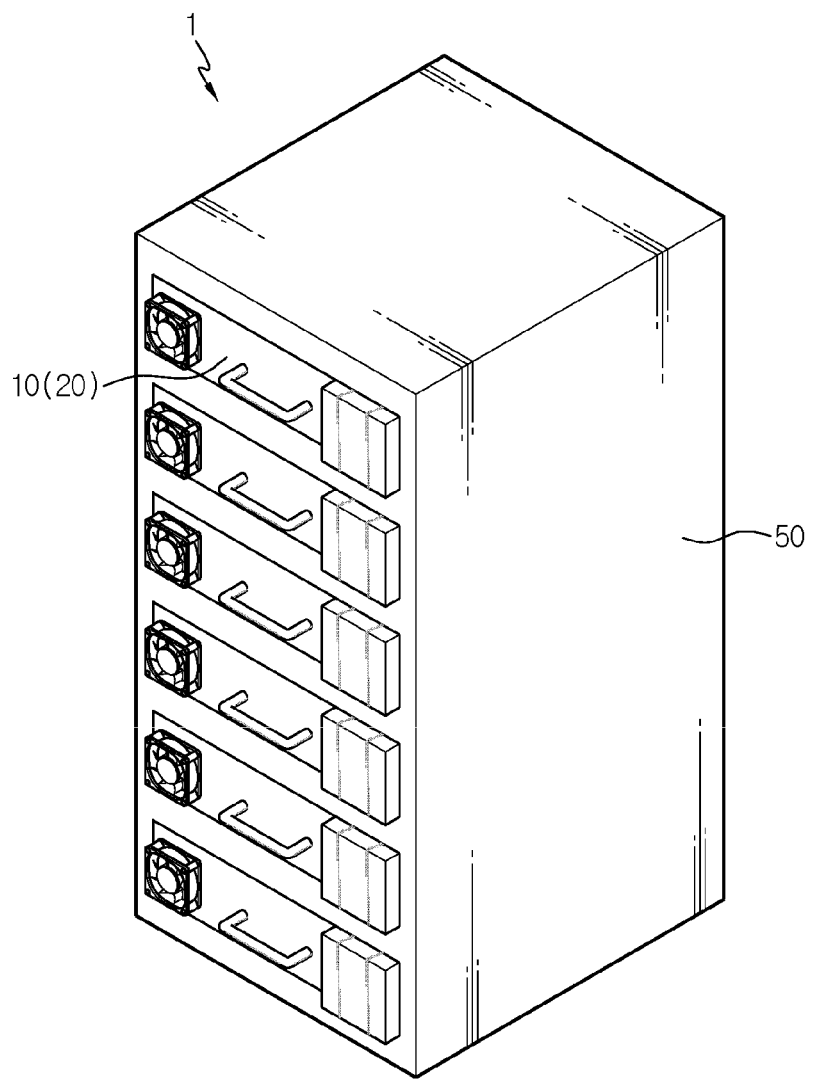
FIG. 10 is a diagram for illustrating a battery rack according to an embodiment of the present disclosure.

FIG. 10 is a diagram for illustrating a battery rack according to an embodiment of the present disclosure.

Referring to FIG. 10, a battery rack 1 may include at least one battery module 10, 20 according to the former embodiment and a rack case 50 for packaging the at least one battery module 10, 20.

In addition, the battery rack 1 may be provided in other devices, instruments or facilities such as a vehicle a secondary battery, in addition to the energy storage system.

As described above, the battery rack 1 of this embodiment and devices, instruments or facilities such as an energy storage system or a vehicle, which have the battery rack 1, include the battery module 10, 20 as described above, and thus it is possible to implement a battery rack 1 having all the advantages of the battery module 10, 20 described above, or devices, instruments, facilities or the like such as an energy storage system or a vehicle, which have the battery rack 1.

According to various embodiments as above, it is possible to provide a battery module 10, 20, which may quickly discharge high temperature gas and flame to the outside when a high temperature situation occurs due to abnormal heating in the battery module 10, 20 having an air-cooling structure, a battery rack 1 including the battery module 10, 20, and an energy storage system including the battery rack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
    a plurality of battery cells;
    a module case having a front surface, a rear surface, a first side surface and a second side surface, the module case configured to accommodate the plurality of battery cells and having inner cooling channels formed at both sides of the plurality of battery cells;
    a plurality of openings provided at each side surface of the module case to face the inner cooling channels of the module case, the plurality of openings spaced apart from each other by a predetermined distance along a longitudinal direction of the module case; and
    a pair of film members, one of the pair of film members mounted to each of the side surfaces of the module case to cover the plurality of openings, the pair of film members being melted over a predetermined temperature to open the plurality of openings, wherein each film member of the pair of film members covers all of the plurality of openings on a respective side surface of the module case.

2. A battery module, comprising:

a plurality of battery cells;

a module case having a front surface, a rear surface, a first side surface and a second side surface, the module case configured to accommodate the plurality of battery cells and having inner cooling channels formed at both sides of the plurality of battery cells;

a pair of openings, an opening of the pair of openings provided at each side surface of the module case to face the inner cooling channels of the module case; and a pair of film members, one of the pair of film members mounted to each of the side surfaces of the module case to cover the opening, the pair of film members being melted over a predetermined temperature to open the opening, wherein the pair of openings are provided with a mesh in the pair of openings.

3. The battery module according to claim 2, wherein the pair of film members cover the pair of openings, respectively.

4. The battery module according to claim 1, further comprising:

a cooling unit provided to the module case to supply a cooling air toward the inner cooling channel and discharge the cooling air out of the module case.

5. The battery module according to claim 4, wherein the cooling unit includes:

a cooling air supplying portion provided at the front surface of the module case to provide the cooling air toward the inner cooling channel; and a cooling air discharging portion provided at the rear surface of the module case to discharge the cooling air in the inner cooling channel to the outside of the module case.

6. A battery rack, comprising:

at least one battery module according to claim 1; and a rack case configured to package the at least one battery module.

7. An energy storage system, comprising at least one battery rack according to claim 6.

* * * * *